United States Patent [19]
Paton

[11] Patent Number: 5,364,086
[45] Date of Patent: Nov. 15, 1994

[54] COMPOSITE ELASTOMERIC AIR SPRING AND SEALING STRUCTURE

[76] Inventor: H. Neil Paton, 410 16th E., Seattle, Wash. 98112

[21] Appl. No.: 161,058

[22] Filed: Dec. 2, 1993

Related U.S. Application Data

[63] Continuation of Ser. No. 758,849, Sep. 13, 1991, abandoned, which is a continuation-in-part of Ser. No. 692,942, Apr. 29, 1991, abandoned.

[51] Int. Cl.⁵ .................. F16F 3/10; B60G 11/46; F16J 3/04
[52] U.S. Cl. .................. 267/140.4; 267/64.28; 267/34; 267/35; 285/101; 285/367; 277/166; 277/207 R; 220/307; 248/562; 248/361
[58] Field of Search .......... 267/64.16, 64.19, 64.23, 267/64.27, 64.28, 23, 33–35, 116, 122, 140, 140.3–140.4, 152, 179; 285/367, 97, 101; 277/166, 207 R, 212 C; 220/320, 307, 306; 248/631, 562, 621

[56] References Cited

U.S. PATENT DOCUMENTS

| | | | |
|---|---|---|---|
| 1,537,112 | 5/1925 | Glackin | 267/64.27 |
| 2,496,893 | 2/1950 | Smith | 267/64.27 |
| 2,596,031 | 5/1952 | Kaufman | 267/64.19 |
| 2,790,650 | 4/1957 | Boschi | 267/35 |
| 2,818,249 | 12/1957 | Boschi | 267/35 |
| 2,955,814 | 10/1960 | Locklin | 267/64.27 |
| 3,066,929 | 12/1962 | Gregoire | 267/31 |
| 3,118,659 | 1/1964 | Paulsen | 267/35 |
| 3,560,017 | 2/1971 | Vogel et al. | 267/64.16 X |
| 3,584,856 | 6/1971 | Desbois | 267/34 |
| 3,625,501 | 12/1971 | Hein et al. | 267/33 X |
| 4,355,792 | 10/1982 | Fukuda et al. | 267/153 |
| 4,564,177 | 1/1986 | Leonard | 267/35 X |
| 4,721,414 | 1/1988 | Akiyama | 267/140 X |
| 4,771,989 | 9/1988 | Smith | 267/33 |
| 4,784,376 | 11/1988 | Ecktman | 267/64.27 |
| 4,792,597 | 12/1988 | Smith | 267/33 |
| 4,817,921 | 4/1989 | Stevenson | 267/33 |
| 4,957,277 | 9/1990 | Paton | 267/33 |

FOREIGN PATENT DOCUMENTS

| | | | |
|---|---|---|---|
| 0238959 | 8/1960 | Australia | 267/64.27 |
| 660461 | 4/1963 | Canada | 267/64.27 |
| 1214073 | 6/1964 | France . | |
| 1365203 | 6/1964 | France . | |
| 616971 | 8/1935 | Germany . | |
| 662622 | 7/1938 | Germany . | |
| 1011675 | 7/1957 | Germany | 267/33 |
| 1068952 | 9/1959 | Germany . | |
| 1134337 | 8/1962 | Germany | 267/33 |
| 1946971 | 12/1966 | Germany . | |
| 6930349 | 12/1969 | Germany . | |
| 1264484 | 6/1961 | Luxembourg . | |
| 0885925 | 1/1962 | United Kingdom | 267/64.27 |
| 1437525 | 5/1976 | United Kingdom . | |
| 2153483 | 8/1985 | United Kingdom | 267/219 |

OTHER PUBLICATIONS

Patent Abstracts of Japan, vol. 9, No. 55, Mar. 9, 1985, Yoshitaka Oosawa, "Pneumatic Spring", Oct. 29, 1984.

Primary Examiner—Robert J. Oberleitner
Assistant Examiner—Josie A. Ballato
Attorney, Agent, or Firm—Finnegan, Henderson, Farabow, Garrett & Dunner

[57] ABSTRACT

The spring includes a composite elastomeric body having in one embodiment a closed end and an open end. A coil spring is embedded both within the body wall and the closed end, and provides reinforcement of both the body wall and the closed end. The body may be of cylindrical, conical, or other shape, depending upon the required function of the spring. It may also take an essentially hourglass shape or the shape of a cylinder flanged at both ends. Alternately, the spring may be internally pressurized to provide load leveling or air spring effects in addition to the variable rate load versus deflection curve normally obtained. The body may be attached directly to any surface to create an airtight seal. Alternately, a closure plate may be provided to seal an open end of the coil spring.

24 Claims, 8 Drawing Sheets

COMPOSITE ELASTOMERIC AIR SPRING AND SEALING STRUCTURE

CROSS-REFERENCE TO RELATED APPLICATION

This application is a continuation of application Ser. No. 07/758,849, filed Sep. 13, 1991, now abandoned; which was a continuation-in-part of application Ser. No. 07/692,942 filed on Apr. 29, 1991, now abandoned.

BACKGROUND OF THE INVENTION

1. Field of the Invention

This invention relates to composite elastomeric springs and, more particularly, to hollow composite elastomeric springs capable of providing a variable rate spring load versus deflection curve under certain load conditions.

2. Description of the Related Art

There are many applications in which it is desirable to obtain a variable rate load versus deflection curve at or above certain load levels or deflections. Elastomeric springs often are selected for such applications, because many elastomeric materials and particularly natural rubber provide this kind of spring curve when subjected to uniaxial compression. In addition to providing variable rate spring curves, they also provide inherent vibration damping. Elastomeric springs typically take the form of solid blocks of elastomer or natural rubber.

When formed into hollow or cylindrical shapes and sealed with respect to external pressure, elastomeric springs may yield additional spring properties due to the compression of the air space within the hollow elastomeric body. For example, hollow elastomeric springs may provide spring properties generally similar to air springs while pressurized internally, or they may provide shock or load damping when selectively collapsible in response to the discharge of internal air pressure through a restricted orifice or the like. The spring effects thus obtained provide additional flexibility with respect to the variable rate spring curve obtained.

Hollow elastomeric springs, however, tend to be unstable, especially when formed with thin walls. To overcome this, some springs of this construction include a helical coil spring embedded within the wall of the elastomeric spring body. The composite elastomeric spring thus obtained is of generally tubular construction with opposed open ends. To pressurize this spring internally, it is necessary to establish continuous seals about both ends. Depending upon the construction of the load platens between which the spring is compressed, the seals tend to leak or break down both as the ends of the spring are deflected under load and as the spring resumes its relaxed state after compression.

SUMMARY OF THE INVENTION

The present invention has been made in view of the above circumstances and has as a principal object the provision of a combined coil spring and elastomeric material to produce a composite spring having the advantages of the elastic properties of both the coil spring and the elastomeric material.

Another object of the present invention is to provide a composite elastomeric spring in which one end is not only closed but also is reinforced by the same spring coil which acts as reinforcement for the side wall.

A further object of the present invention is to provide springs of specific geometries that display advantageous elastic properties. For example, a spring may take a conical shape.

Another object of this invention is to provide a composite elastomeric spring having one open end and one closed end, and a passage formed in the closed end which may be sealably closed or opened to allow entry to and egress from the interior of the spring.

Another object of this invention is to provide an improved hold-down and sealed closure construction for a composite elastomeric spring having one or both ends open and adapted to accommodate the improved construction.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the spring of this invention comprises a hollow elastomeric body and a spring coil embedded in the body. The body includes at least one open end and a peripherally closed wall. In embodiments having a circular configuration with one closed end, the spring coil includes both a decreasing diameter or spiral coil segment embedded in the closed end, and a helical spring segment embedded in the axially extending wall portion of the elastomeric body to resiliently reinforce the hollow body.

The objects of the present invention may also be accomplished by a spring open at both ends and having any one of a variety of specific shapes. For example, the spring may take the form of the frustums of two oppositely divergent cones joined together at their small ends. The spring may also take the form of two conical frustra attached at their small ends to the ends of an intermediate cylindrical body portion.

According to one presently preferred embodiment of this invention, the wall includes a generally cylindrical portion between the open end and the closed end, and the coil spring includes at least one constant diameter helical coil segment embedded in the cylindrical portion. According to another presently preferred embodiment of this invention, the wall includes a generally conical portion between the open end and the closed end, and the coil spring correspondingly includes a conical helix portion and at least one additional decreasing diameter spiral portion embedded in the small end of the conical portion. One closed end of the spring may, but need not, include a passage through which a suitable pressure fluid may be introduced into or exhausted from the interior of the spring, and means for sealably closing this passage.

According to still further embodiments of the invention, the body, whether of generally cylindrical or conical shape, includes an annular shoulder projecting outwardly from an open end. A hold-down ring may be partially embedded within or positionable in overlying relation to the shoulder. When this ring is drawn toward an underlying surface, it presses the shoulder against the surface in a way which establishes a continuous seal about the open end. One presently preferred embodiment of the hold-down ring includes a stiffening lip that overlaps and contains bulging of the outer edge of the shoulder while it is pressed against the surface.

This lip also acts as a stop against further deflection of the shoulder. When embedded, and supported by the outermost coil of one coil spring, the hold-down ring also acts as a locator for molding the elastomeric body. In another hold-down ring embodiment the outer stiffening lip extends upwards and does not prevent the elastomer in the shoulder from bulging. If not embedded, the hold-down ring preferably includes a collar that engages and causes the shoulder to be deflected only along its inner edge, or adjacent the outer surface of the wall.

In yet another embodiment, the annular shoulder is provided with projecting elastic ribs which extend about the periphery on the radial face of the annular shoulder. The ribs are compressed between the shoulder and a closure member to assure an adequate gas-tight seal between the elastomeric body and the closure member.

To assure an even and continuous seal between the elastomeric body and the closure member as well as symmetrical load bearing characteristics, the coil spring embedded within the body is preferably mechanically flattened by abrading, for example, so that the spring coil presents an essentially planar bearing surface to at least the open end or ends of the spring.

Thus, it will be appreciated that the present invention provides a composite elastomeric spring in which the closed end is capable of withstanding and transferring supporting load forces directly to the spring walls. The spring effects obtained may or may not be supplemented by internal pressurization of the spring, depending on the requirements of the application to which it is put. In applications where the height of the spring must be kept to a minimum, for example, the loss of resilient load bearing support resulting from a reduction in spring height may be offset by forming the body of generally conical shape, and, if necessary, increasing the wall thickness so the coil spring is closer to the outer surface of the body wall.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Figure 1:
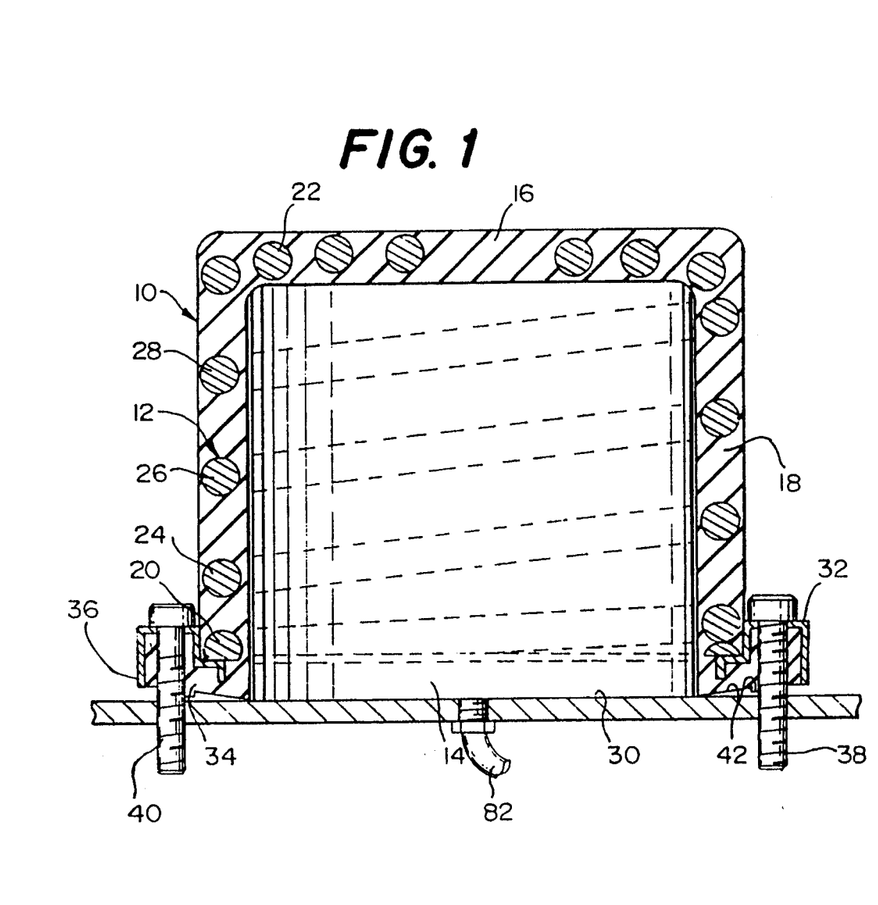
FIG. 1 is a longitudinal section of one presently preferred embodiment of the present invention.

In FIG. 1, one presently preferred embodiment of the present invention is shown to include a hollow elastomeric body, generally designated by numeral 10, and a coil spring, generally designated by numeral 12, embedded in body 10. Body 10 includes one open end 14, one closed end 16 and a wall 18 of generally circular transverse cross section. One end of coil spring 12 includes a constant diameter, helical coil 20 embedded in wall 18 adjacent open end 14. The other end of coil spring 12 includes a decreasing diameter, generally spiral coil 22 embedded in closed end 16. In the illustrated embodiment, spiral coil 22 has four turns.

Wall 18 further includes a generally cylindrical portion between open end 14 and closed end 16. In this embodiment, coil spring 12 includes three additional constant diameter of helical windings 24, 26, and 28 interposed between constant diameter coil 20 and decreasing diameter coil 22. Like coil 20, these additional coil windings are embedded in the cylindrical portion of wall 18, as shown in FIG. 1.

As shown in FIG. 1, open end 14 may be pressed against and sealed with respect to an underlying surface 30. In the illustrated embodiment, this is accomplished by a hold-down ring 32 partially embedded in a shoulder 34 that projects radially outwardly from open end 14. Ring 32 is supported along its inner rim by a mechanically flattened end turn of coil 20. By suitably positioning ring 32 with respect to coil 20, ring 32 may act as a guide to ensure proper location of the coil 12 when the spring 10 is molded. Ring 32 rigidly prevents the inner diameter of the shoulder 34 from rolling inwardly when the interior of body 10 is pressurized.

The flattened end turn of coil 20 is conventionally shaped by forming or abrading. This feature of the spring is important from the standpoint of effecting a conversion of the inclined orientation of the turns of a helix to an end bearing which is substantially perpendicular to the axis of the helix.

Ring 32 also includes a flanged lip 36. While preferably lip 36 overlaps the outer edge of shoulder 34 and constrains outward bulging of shoulder 34 when ring 32 is drawn down against shoulder 34, as will be described presently, lip 36 may be upturned, opposite to the orientation shown in FIG. 1 to allow unconstrained bulging of shoulder 34. This construction also tends to provide desirable stiffness to ring 32. In the example illustrated in FIG. 1, lip 36 also acts as a stop when it contacts surface 30, thereby preventing further compression of shoulder 34. It will be recognized that two rings of the same or generally similar construction as ring 32 could be used to retain and cause a seal to be formed at both ends of an open ended tube.

Several retaining bolts are spaced apart at equal intervals about shoulder 34, and when tightened, draw ring 32 down onto shoulder 34 and press it against surface 30. In FIG. 1, only two bolts are shown and are designated by numerals 38 and 40. These bolts extend through openings formed by shoulder 34 and are anchored by nuts (not shown) beneath surface 30. To facilitate the establishment of a tight pressure seal between surface 30 and shoulder 34, the bottom surface of shoulder 34 includes one or more deformable annular steps 42 which, when pressed against surface 30, form a continuous seal about the opening in open end 14.

Figure 4:
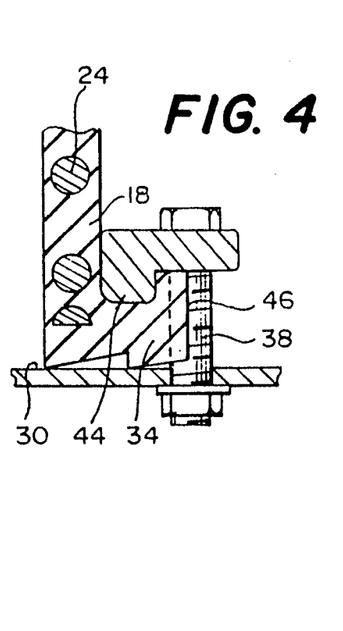
FIG. 4 is a partial longitudinal section of a modified construction of the FIG. 1 hold-down ring.

A modified form of hold-down ring is illustrated in FIG. 4. In this construction, the hold-down ring includes a solid collar 44 which registers with the outer surface of wall 18 adjacent the base of shoulder 34. When the FIG. 4 hold-down ring is drawn down toward surface 30, shoulder 34 is pressed against surface 30 and forms a continuous seal. Unlike the FIG. 1 hold-down ring 32, collar 44 concentrates the compressive force exerted on the upper face of shoulder 34 along its inner edge. This concentration of hold-down force tends to resist lifting of shoulder 34 when the spring is pressurized internally. Unlike the FIG. 1 shoulder 34, the FIG. 4 shoulder 34 terminates at edge 46, exposing part of bolt 38. This allows unrestrained bulging of shoulder 34 between the bolts 38, but traps the elastomer laterally. This prevents the inner diameter of shoulder 34 from rolling inwardly when the interior of body 10 is pressurized.

Figure 2:
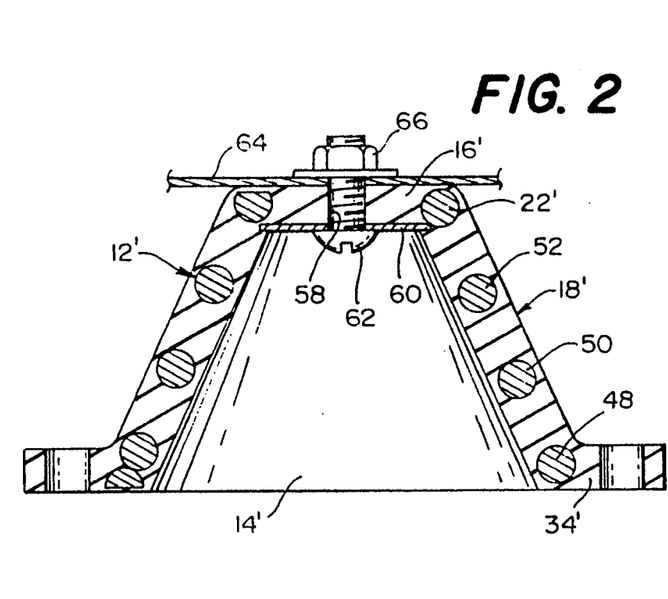
FIG. 2 is a longitudinal section of a second presently preferred embodiment of the present invention.

In the example illustrated in FIG. 1, body 10 is elongated. In some applications of the present invention, however, it may be desirable to reduce the spring height, while retaining the resilient spring effects obtained by having the decreasing diameter or spiral coil embedded in the closed end. According to a second preferred embodiment of this invention, the spring wall may include a generally conical portion between the open end and the closed end, and the coil spring 12 may include at least one additional decreasing diameter coil winding 22 embedded in the conical portion. This embodiment is illustrated in FIG. 2. In FIG. 2, parts corresponding to those already illustrated and described with reference to FIG. 1 are not, for sake of brevity, further described herein, and are designated with the same reference numerals, primed.

As shown in FIG. 2, the outer wall 18' is generally conical between open end 14' and closed end 16'. In the embodiment illustrated, coil spring 12', a conically shaped helical coil, includes three decreasing diameter coil windings 48, 50 and 52 embedded in wall 18. The FIG. 2 spring may be secured by either the FIG. 1 or FIG. 4 hold-down rings. However, if the interior of the composite elastomeric spring 10 is not pressurized, a hold-down may not be required.

Figure 3:
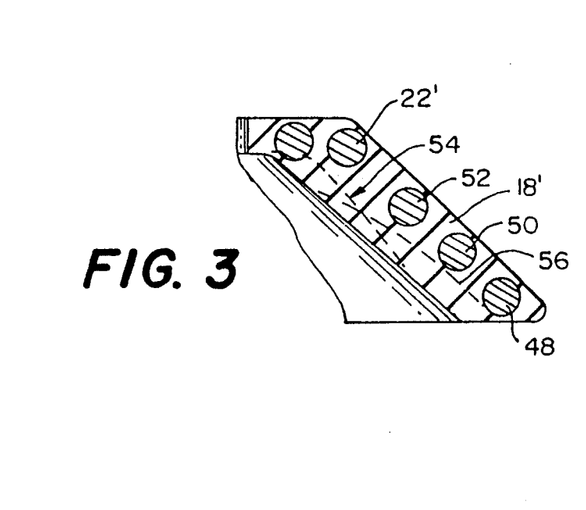
FIG. 3 is a partial longitudinal section of a modified construction of the FIG. 2 spring.

The force versus the deflection curve of the conical spring depicted in FIG. 2 may be controlled by varying the thickness and or contour of wall 18' as shown in FIG. 3. The force versus deflection curve may also be changed by altering the location of the spring coils 12 in relation to the inner and outer surfaces of wall 18'. By positioning the spring coil windings 48, 50, 52, and 22' near the outer surface of wall 18', the force versus deflection curve obtained tends to be steeper. That is, the spring 10 tends to be stiffer in response to axial deflection.

The spring curve obtained also may be controlled by contouring the interior surface of wall 18' as depicted by the broken lines 54 and 56 in FIG. 3. By making the upper portion of wall 18' thinner than the lower portion, as depicted by broken line 54, the force versus deflection curve obtained tends to be steeper, or the spring tends to be stiffer. Conversely, by making the lower portion of wall 18' thinner than the upper portion, as depicted by broken line 56, the spring tends to be less stiff.

As shown in FIG. 2, closed end 16' includes a relief passage 58. This passage may be sealably closed in those applications in which the interior of the spring 10 is to be pressurized. The interior of spring 10 may be pressurized only when spring 10 is mounted and sealed to an underlying surface 30. In the example illustrated, relief passage 58 is sealed closed by a washer 60 held against the inside of closed end 16' by a bolt 62 that projects upward through relief passage 58. The bolt 62 also passes through an overlying load platen 64. A nut 66 is secured to the projecting exposed end of bolt 62 and, when tightened onto bolt 62, draws washer 60 snugly against the interior of closed end 16', sealing relief passage 58. When it is desired to open relief passage 58, bolt 62 is loosened. This allows the pressurized fluid to pass past bolt 62 and through the relief passage 58.

Figure 5:
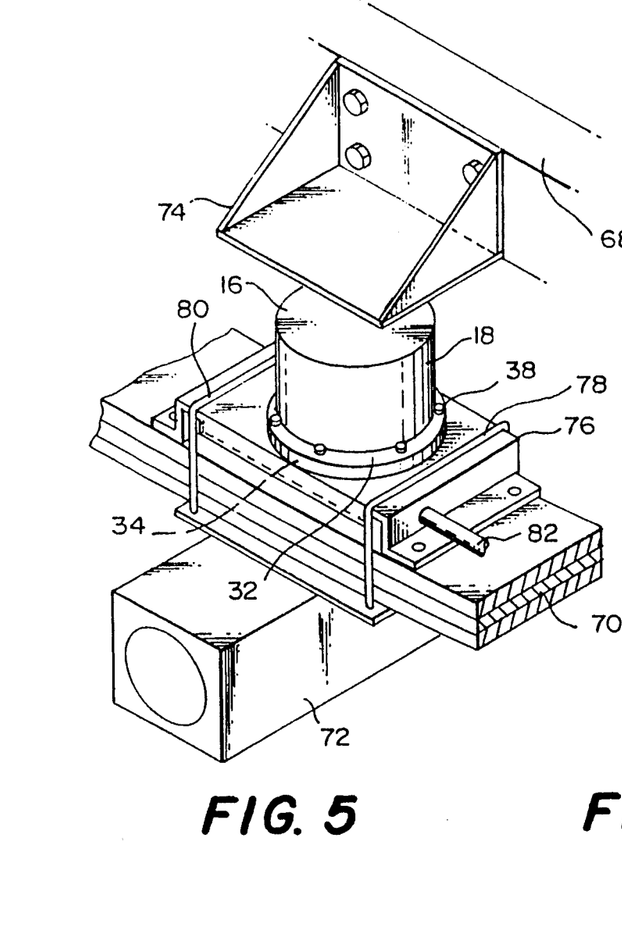
FIG. 5 is a perspective view depicting the application of the FIG. 1 spring to a load leveling system for a pickup truck, with the system in an unloaded condition.
Figure 6:
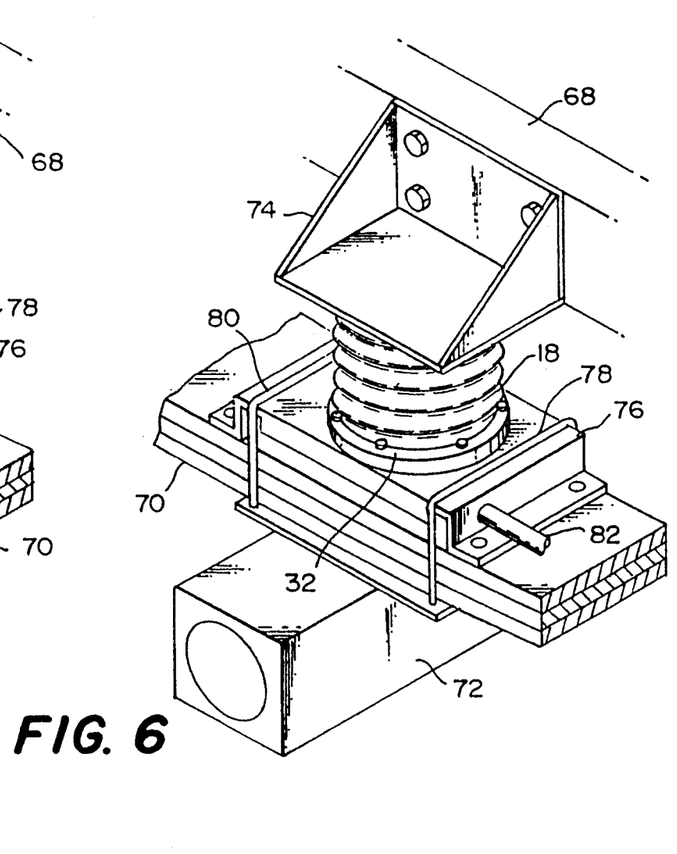
FIG. 6 is a perspective view illustrating the FIG. 5 system in a loaded condition.

As shown in FIGS. 5 and 6, the FIG. 1 spring is used as a load leveling suspension for the frame 68 of a pickup truck, for example. In this application, the FIG. 1 spring is pneumatically inflated to provide load support and load leveling capability for a load bed above or adjacent two rear leaf springs that support a rear axle 72. Only one leaf spring is shown and is indicated by numeral 70. Unlike prior load leveling devices designed to stay in contact with the load bed at all times, including both jounce and rebound conditions, the application of the present invention provides resilient load support only after the frame or load bed has been loaded and deflected a predetermined amount with respect to the chassis. Once this occurs, the load leveling suspension is operative and may be used to provide load support and leveling capability in response to the application of additional weight. As will be appreciated, this application requires two spring assemblies one adjacent each end of the rear axle 72, either adjacent or overlying the two rear leaf springs, respectively. For purposes of illustration, only the left side spring assembly is illustrated and described in detail, and parts corresponding to those already illustrated and described with reference to FIG. 1 are designated by the same reference numerals, primed.

Referring now in particular to FIGS. 5 and 6, the FIG. 1 spring is mounted vertically between two spaced apart load bearing supports with closed end 16 face up. The FIG. 1 spring may be positioned between the leaf spring 70 and the frame 68. An upper support 74 projects transversely from and is attached to frame 68. A lower support 76 is secured by two U-bolts 78 and 80, and rests upon leaf spring 70 in transverse relation to rear axle 72. In the unloaded condition depicted in FIG. 5, a space is formed between the closed end 16 and support 74.

As the truck is loaded to a certain weight, however, frame 68 is deflected downwardly until support 74 comes in contact with closed end 16, as depicted in FIG. 6. If additional weight is added, the load bed 68 is further deflected causing the spring to be compressed between it and the load support 76, or between the load supports 74 and 76 as shown in FIG. 6. As the deflection increases, the spring provides load bearing support in addition to that provided by the leaf springs, or the truck's other suspension elements. Due to the variable spring rate provided by the spring shown in FIG. 1, however, the suspension is stiffened before bottoming out. This provides a more desirable ride than would otherwise be obtained solely through the use of leaf springs.

To level frame 68, the FIG. 5 spring may be pressurized by a fluid introduced from an external pressure source (not shown), or a source carried by the truck. If desired, the amount of pressure fluid introduced into the interior of the spring via pressure line 82 may be controlled with respect to the amount of pressure fluid introduced into the opposite spring assembly (not shown) to establish a differential pressure-induced force on one side of the truck or the other. This may be sufficient to level frame 68 to a desired degree. It will be recognized that this suspension design may be used in other types of vehicles to provide leveling or raising or lowering of the body with respect to the chassis.

One application of the spring 10 shown in FIG. 2 is as a progressive rate load bearing spring for a reclining chair, for example. The spring 10 shown in FIG. 2 is particularly desirable for this and other applications in which space constraints 10 restrict the height or the length of the spring. In such applications, the decreasing diameter coil 22', when deflected by a force applied along the center axis of the spring, may deflect inwardly a sufficient amount to provide acceptable resilient load bearing support. The FIG. 2 spring may or may not be internally pressurized.

An advantage of both of the constructions depicted in FIG. 1 and FIG. 2, is that the coil spring 10 and the elastomeric body may be constructed so that they share to varying degrees the load applied. In those applications where the spring shown in FIG. 1 is used to replace or as a replacement or substitute for air springs, for example, the coil spring may be sized so that it possesses a sufficient load bearing capacity to remain active even though the source of external pressure is lost or removed.

Figure 7:
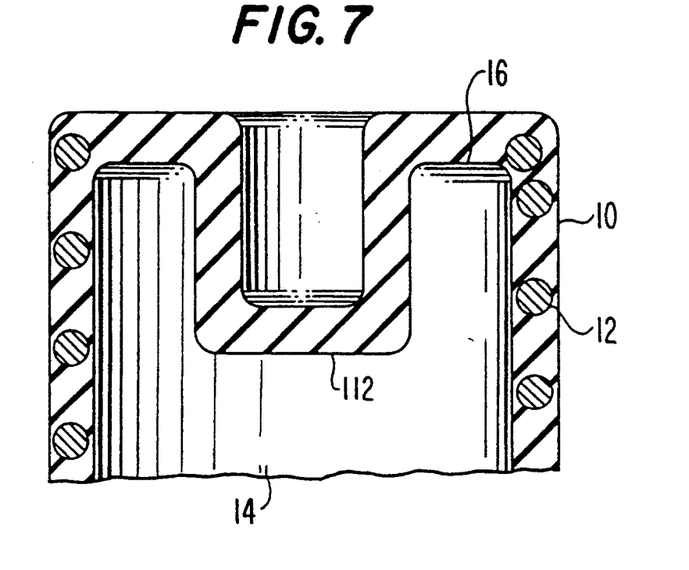
FIG. 7 is a fragmentary cross-section illustrating an alternate embodiment of the spring coil showing the addition of a closed second compression member at the center of the elastomeric body.
Figure 8:
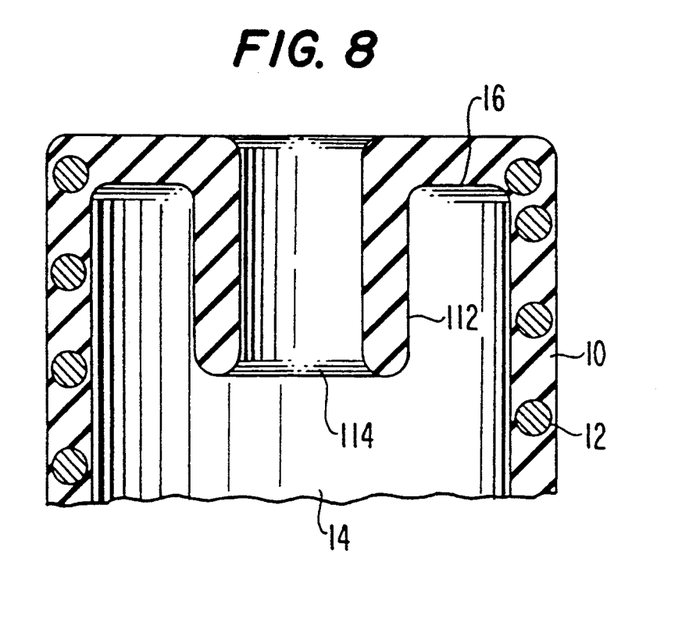
FIG. 8 is a fragmentary cross-section illustrating the elastomeric body having an open second compression member.

As shown in FIG. 7, the hollow elastomeric body 10 is provided with a second compression member 112 projecting from the interior surface of the closed end 16. FIG. 7 depicts a sealed or closed second compression member 112, whereas FIG. 8 illustrates an open second compression member 112 having an aperture 114 therein which allows the pressure fluid to escape when the elastomeric body 10 is compressed. The aperture 114 may also be provided to allow a shaft, such as in a hydraulic damper or automotive strut, to pass therethrough. The second compression members 112 depicted in both FIG. 7 and FIG. 8 may be attached to closed end 16 with or without a decreasing diameter coil 22.

In the previously described embodiments, the spring of the present invention is closed at the open end thereof by drawing the ring 32 against the surface of a plate-like component of the device in which it is used, that is, the component which defines the underlying surface such as the load support 76 in the exemplary application of FIGS. 5 and 6. In FIGS. 9-20, variations of a self-contained spring embodiment of the invention are illustrated.

Figure 9:
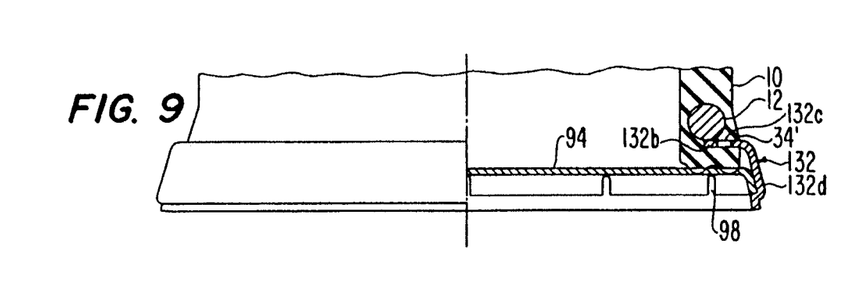
FIG. 9 is a fragmentary cross-section depicting a method for attaching the hold-down means to the closure plate.

FIG. 9 illustrates an exemplary, self-contained embodiment of the present invention in which a modified hold-down ring 132 attaches to a closure plate 94 having a downwardly and outwardly flared peripheral edge 96. The hold-down ring 132 includes an upper radial flange 132b, having spaced slots 132c for anchorage in the molded elastomeric body 10, and a depending peripheral skirt portion 132d. The skirt portion 132d is formed with an inwardly presented annular engagement ledge 92 to receive and engage the peripheral edge 96 of the closure plate 94.

Figure 10:
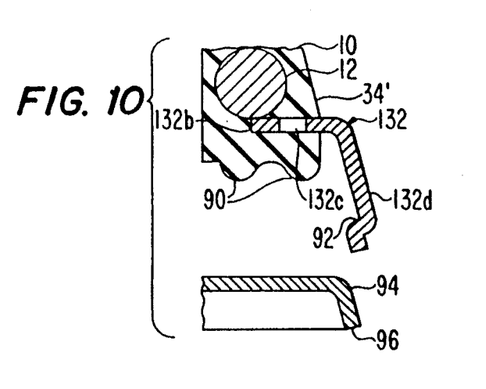
FIG. 10 is a partial cross-section illustrating the connection of FIG. 9 in greater detail.

Also it is to be noted from FIG. 10, that the shoulder 34', defining the open end of the body 10, is provided with a radial end face from which a pair of continuous annular ribs 90 project. By forced pressing of the closure plate 94 into the ring 132, the annular elastic ribs 90 deform elastically to securely engage the closure plate 94 to create a gas-tight seal around the hollow elastomeric body 10.

To facilitate such assembly, the closure plate 94 preferably includes spaced notches 98 in the peripheral edge 96. These notches 98 impart flexibility to the peripheral edge 96 of the closure plate 94 to facilitate the forced insertion of the plate 94 into the hold-down ring 132. The same flexibility can not be achieved by adding gaps to the skirt portion 132d of the hold-down ring 132, because forcing the skirt portion 132d outward goes against the inherent compression of hold-down ring 132 and natural curvature of skirt 132d.

Figure 11:
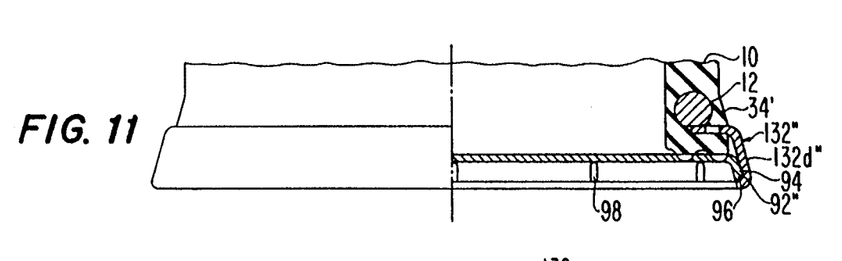
FIG. 11 is a partial cross-section illustrating a third embodiment of the connection between the hold-down means and the closure plate.

FIGS. 9, and 11 each depict slightly different constructions principally of the skirt portions of the hold-down ring 132 and closure plate 94. In FIG. 9, the engagement ledge 92 is provided by an off-set edge portion struck inwardly from the skirt portion 132d of the hold-down ring 132. In FIG. 11, the ledge 92" in the skirt portion 132d" of the hold-down ring 132" is an inwardly bent segment of the peripheral skirt edge.

Figure 12:
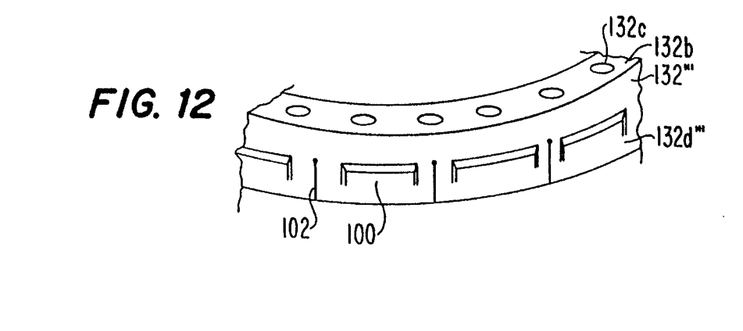
FIG. 12 is a partial perspective view showing the hold-down ring provided with prongs to clamp the hold-down means to the closure plate.
Figure 13:
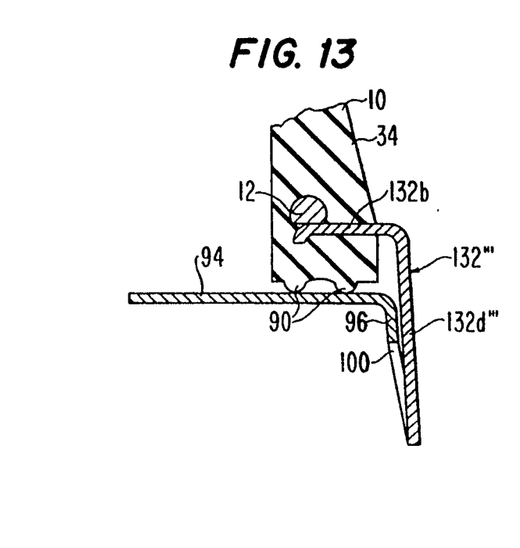
FIG. 13 is a fragmentary cross-section of FIG. 12.

FIG. 12 depicts another variation of the retention of the plate 94 and the hold-down ring. In this embodiment, as shown in cross-section in FIG. 13, the hold-down ring 132''' is provided with a plurality of peripherally spaced prongs 100 inwardly projecting from the downwardly extending peripheral skirt portion 132'''. The prongs 100 extend inward far enough to engage the peripheral edge 96 of the closure plate 94 to prevent separation of the closure plate 94 from the hold-down ring 132'''. To provide greater flexibility in the skirt of the hold-down ring 132''' the skirt 132d''' may be provided with spaced slits 102.

In each of the embodiments of FIGS. 9-13, the ledge 92 or prongs 100 engage the edge 96 of the plate 94 in a manner to establish the extent to which the sealing ribs 90 are compressed after assembly of the plate 94 and ring 132. Thus, by proper dimensioning of the plate and the ring, the optimal sealing pressure of the ribs 90 and plate 94 can be attained.

Also it will be noted that the radial flange portions of the rings 132 extend outwardly from the exterior of the shoulder 34 of the elastomeric body 10. As a result of such outward extension of the radial flange portion, an upwardly presented and exterior clamping surface is provided by which the plate 94 may be drawn into the ring 132, using appropriate tooling, and without need to compress or otherwise use the elastomeric body 10 during this assembly procedure.

Figure 14:
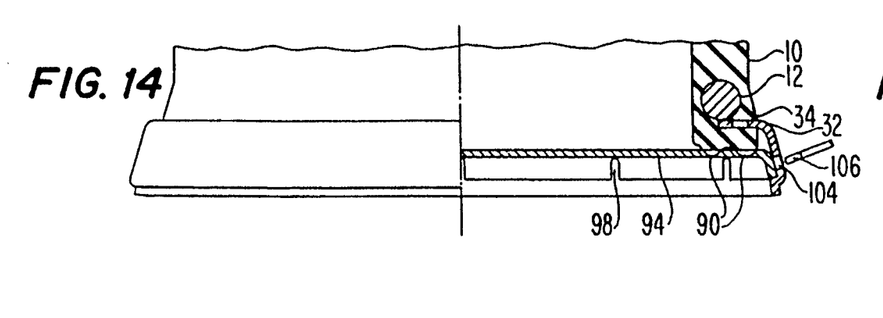
FIG. 14 is a partial illustration showing the placement of apertures in the hold-down means so that the closure plate may be easily separated from the hold-down means.
Figure 15:
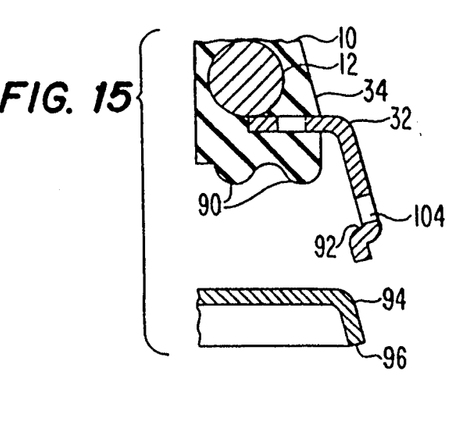
FIG. 15 is a cross-sectional view of an aperture in the hold-down means.

FIGS. 14 and 15 depict the embodiment of FIG. 9 of the present invention with the added feature of apertures 104 extending through the skirt portion of hold-down ring 132. The apertures 104 allow a tool 106 to be placed therein to displace the closure plate 94 from the hold-down ring 132 so that the hollow elastomeric body 10 may be separated from the closure plate 94.

Figure 16:
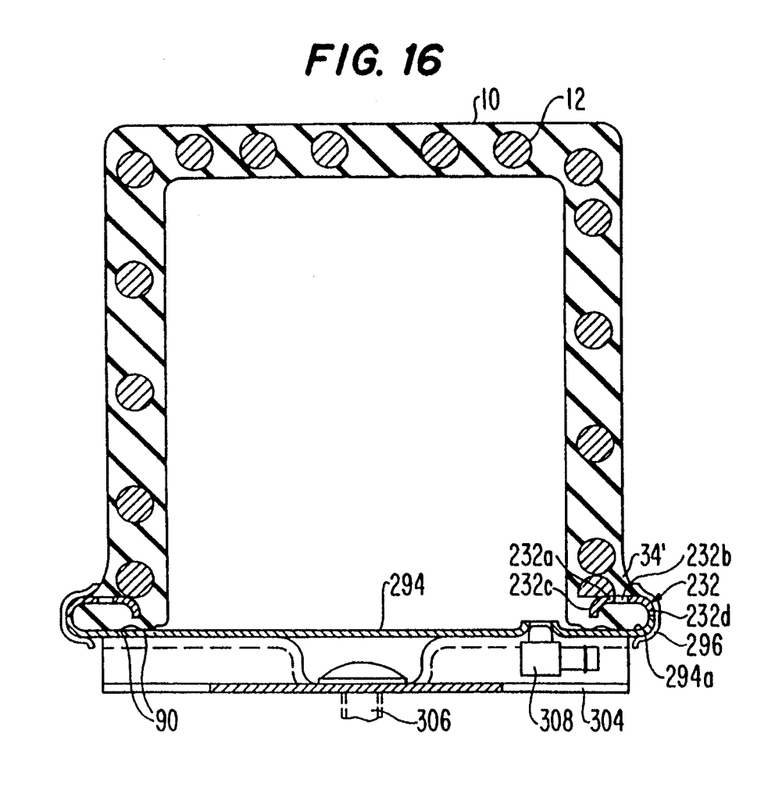
FIG. 16 is a cross-section of another embodiment of the hold-down device showing the attachment of a removal vice ring.
Figure 17:
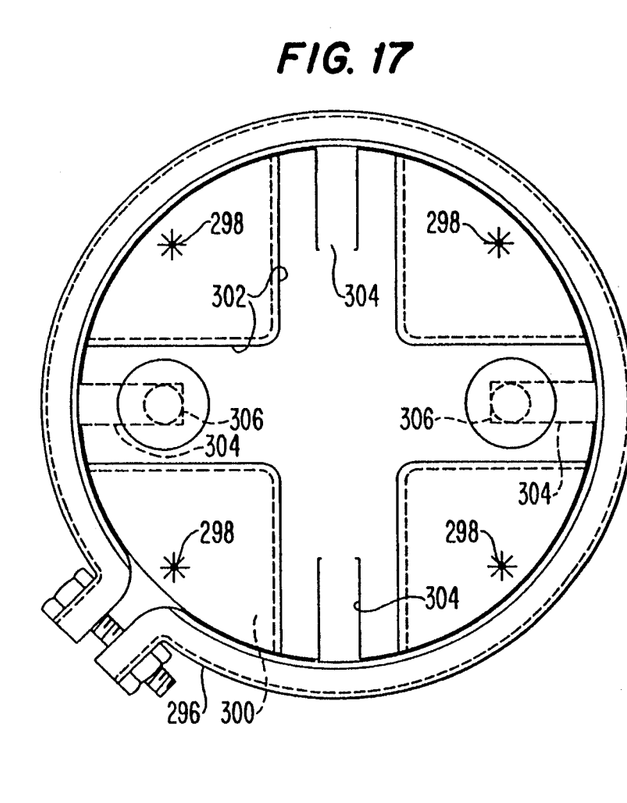
FIG. 17 is a top view of the apparatus illustrated in FIG. 16.

In FIGS. 16 and 17, a further alternative embodiment of the invention is illustrated. In this embodiment, the hold-doom ring 232, though again annular and extending completely around the open end of the body 10, is generally rounded in radial, cross section to establish a relatively flat central portion 232a, having apertures or slots 232b for anchorage in the elastomeric material of the body, and rounded inner and outer edges 232c and 232d, respectively. The closure plate 294, in this embodiment, is of dish-shaped configuration as a result of a rounded peripheral edge 294a, which in cross section, is a mirror image of the outer edge 232d on the ring 232. Thus, when the closure plate 294 is placed in alignment with the ring 232, the plate and ring present an outwardly convex conformation at the outer edges thereof. As a result of this composite convex conformation, the closure plate 294 and the ring 232 are effectively compressed toward one another by a band clamp 296 so that the annular ribs 90 are sealed against the closure plate 294. Closure plate 294 and hold-down ring 232 can not over stress the annular ring 90 since the closure plate 294 and the hold-down ring 232 can not pass one another by clamp pressure.

Also in the embodiment of FIGS. 16 and 17, the closure plate 294 is fixed, such as by spot welds 298, to a mounting bracket 300 having depressed, intersecting channels 302 with outwardly open slots 304 to receive mounting bolts 306. In addition, the channels 302 serve to receive and protect a fitting 308 through which pressurized fluid may be introduced through the closure plate 294.

Figure 18:
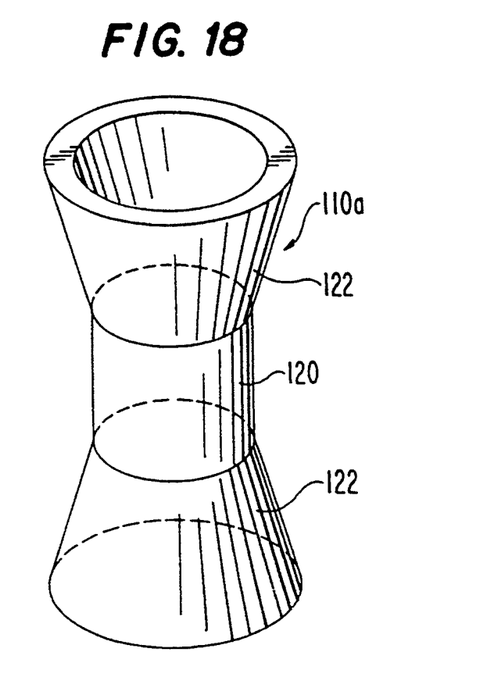
FIG. 18 is a perspective view illustrating an alternate design of the spring coil showing a coil having two flared cone-like ends joined with a central cylindrical portion.
Figure 19:
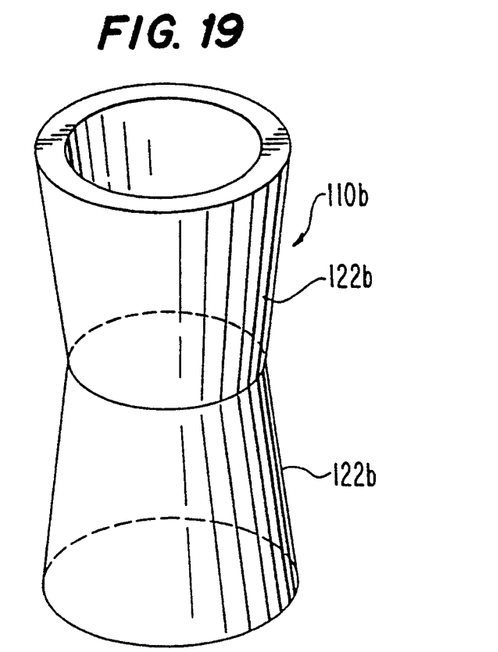
FIG. 19 is an isometric illustration showing a spring coil having flared ends without a central cylindrical portion.
Figure 20:
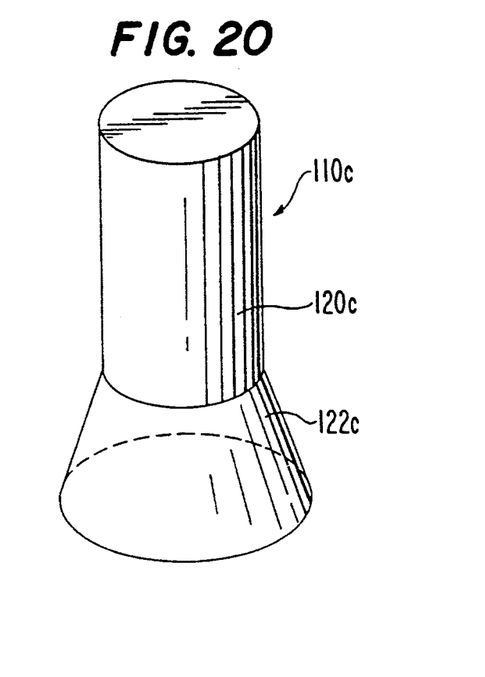
FIG. 20 is an isometric illustration of an embodiment of a composite elastomeric spring of the invention in which an upper cylindrical portion extends from a frusto-conical portion.
Figure 21:
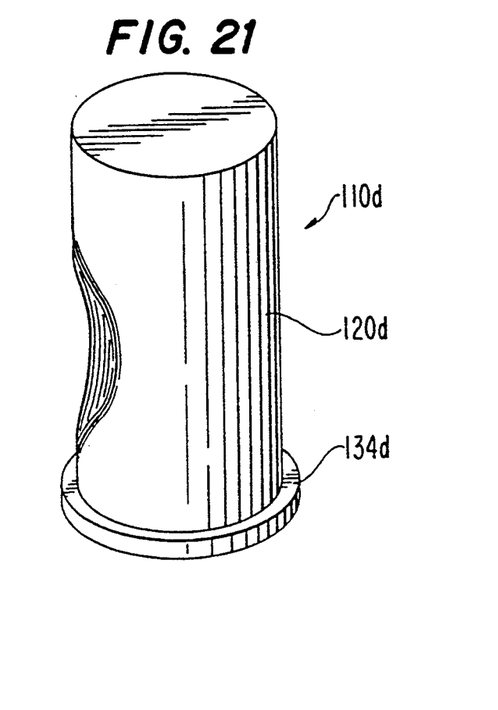
FIG. 21 is an isometric illustration of an embodiment of a composite elastomeric spring of the invention having a non-symmetrical physical configuration.

The spring of the present invention is adaptable to different configurations to accommodate specific and varied applications. FIGS. 18, 19, and 20 illustrate alternate embodiments of the hollow elastomeric body 110a and 110b, respectively. FIG. 18 shows the body 110a having a central cylindrical portion 120 and two oppositely diverging frusto-conical portions 122, one such portion being attached to each end of the cylindrical portion 120. FIG. 19 shows two frusto-conical portions 122b joined at the small ends thereof without an intervening cylindrical portion 120. In both cases, the conical portions 122b and 122b diverge toward the opposite open ends of the body. In FIG. 20, a composite spring embodiment 110c is shown in which a cylindrical upper body portion 120c extends from a generally flared, frusto-conical bottom portion 122c. FIG. 21 illustrates a composite elastomeric spring 110d having a body 120d of a non-symmetrical configuration. The spring embodiment is intended for applications in which a non-symmetrical spring shape is needed to accommodated physical space constraints and/or spring reaction to specific loading requirements. Though not detailed in these figures, all embodiments may be open at opposite ends and thus may be closed by any one of the closure plate constructions previously described.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A composite spring comprising:
   a hollow body of homogenous elastomeric material and having a closed annular wall extending longitudinally between opposite body ends, at least one of the body ends being open;
   a coil spring embedded in said body and extending from a bearing end proximate to and spaced from the open body end to provide a sealing portion of said homogenous elastomeric material in said body adjacent the open body end;
   an annular ring having a radial portion embedded in said annular wall and an exterior portion extending laterally from said radial portion to the outside of the annular wall, said radial portion being positioned between the bearing end of the spring and said sealing portion; and
   means for retaining the annular ring relative to a planar surface to maintain the sealing portion under a compressive force, said sealing portion including at least one continuous annular sealing rib projecting from the open body end to engage and effect a fluid tight seal with the planar surface.

2. A composite spring as recited in claim 1 wherein one of the body ends comprises an at least partially closed radial end wall; said coil spring having a helical portion within said closed annular wall extending continuously as a decreasing diameter radial coil portion embedded in said at least partially closed radial end wall.

3. The composite spring of claim 2, wherein said annular wall is of generally cylindrical configuration between said open end and said closed radial end wall, and wherein the helical portion of said coil spring is of constant diameter for substantially the length of said annular wall.

4. The composite spring of claim 3, wherein said closed end wall includes a passage, and further comprising means for sealably closing said passage.

5. The composite spring of claim 2, wherein said annular wall is of generally conical configuration between said open end and said closed end wall, and wherein the helical portion of said coil spring embedded in said conical annular wall is of a correspondingly conical configuration.

6. The composite spring of claim 5, wherein said decreasing diameter coil portion and said helical portion of said coil are located closer to the outer surfaces of said end wall and said annular wall, respectively than to the inner surfaces of said walls.

7. The composite spring of claim 5, wherein said closed end wall includes a passage, and further comprising means for sealably closing said passage.

8. The composite spring of claim 1, wherein said body includes an annular shoulder projecting outwardly from said annular wall adjacent to said open end.

9. The composite spring of claim 8, wherein said annular ring is partially embedded in said shoulder, said ring having a portion in engagement with said coil spring and a flanged stiffening lip for causing said ring to bear substantially continuously upon said shoulder when said shoulder is pressed against the planar surface in response to a force applied to said ring.

10. The composite spring of claim 8, wherein said annular ring is positionable in overlying relation to said shoulder, said ring having a collar registrable with the outer surface of said wall adjacent said shoulder and a width less than the width of said shoulder, so as to increase the deflection on said shoulder along the inner edge of said shoulder in response to a force applied to said ring.

11. The composite spring recited in claim 1, wherein said bearing end is defined by a flattened end turn of the coil spring.

12. The composite spring recited in claim 1, wherein the sealing portion includes an end face tapering to a sealing lip at the inner surface of the closed annular wall.

13. The composite spring recited in claim 1, wherein the exterior portion of said annular ring provides a bolt receiving annulus for drawing the sealing portion against the planar surface.

14. The composite spring recited in claim 1, wherein said exterior portion of said annular ring includes a generally axial portion for limiting the distance between said radial portion and the planar surface so that the compressive force on the sealing portion is limited by engagement of said axial portion with the planar surface.

15. A composite spring comprising:
a hollow body of homogenous elastomeric material having a closed annular wall extending longitudinally between opposite body ends, at least one of the body ends being open;
a coil spring embedded in said body and extending from a bearing end proximate to and spaced from the open body end to provide a sealing portion of said homogenous elastomeric material in said body adjacent the open body end;
an annular ring having a radial portion embedded in said annular wall and an exterior portion extending laterally to the outside of the annular wall, said radial portion being positioned between the bearing end of the spring and said sealing portion;
a seal plate for closing said open body end and having a planar surface to engage with said sealing portion;
means for retaining the annular ring relative to said planar surface to maintain the sealing portion under a compressive force between the radial portion of said annular ring and said planar surface, said sealing portion including at least one continuous annular sealing rib projecting from the open body end to engage and effect a fluid tight seal with the planar surface.

16. The composite spring recited in claim 15, including a pair of radially spaced continuous sealing ribs projecting from said at least one open body end to engage said planar surface.

17. The composite spring recited in claim 15, wherein said exterior portion of said annular ring extends axially beyond the at least one open body end and includes an inwardly presented ledge spaced axially from said at least one open body end, and wherein said seal plate includes a peripheral edge deformed from said planar surface to engage said ledge.

18. The composite spring recited in claim 17, including means to impart radial flexibility to at least one of said exterior portion and said deformed peripheral edge.

19. The composite spring recited in claim 15 wherein the seal plate has a peripheral edge disposed at a predetermined angle with respect to a central axis of the hollow body, and wherein the laterally extending exterior portion of said annular ring includes an annular plate having a top, a bottom, an inner peripheral edge, and an outer peripheral edge extending from the annular plate bottom at a predetermined angle with respect to the central axis of the closed annular wall means, and
a lip peripherally disposed on the peripheral edge of the annular plate engagement of the peripheral edge of the seal plate to the peripheral edge of the annular plate.

20. The composite spring of claim 19, further comprising:
notches cut into the peripheral edge of the seal plate for increased flexibility and simplified engagement with the annular plate.

21. The composite spring of claim 19, further comprising:
notches cut into the outer peripheral edge of the annular plate for increased flexibility and simplified engagement with the seal plate.

22. The composite spring of claim 19, further comprising:
apertures intermittently disposed about the outer peripheral edge of the annular plate for insertion of a tool therein to facilitate removal of the annular plate from the seal plate.

23. A composite spring comprising:
a hollow elastomeric body having a closed annular wall extending longitudinally between opposite body ends, at least one of the body ends being open;
a coil spring embedded in said body and extending from a bearing end proximate to and spaced from the open body end to provide a sealing portion of elastomeric material in said body adjacent the open body end;
an annular ring having a radial portion embedded in said annular wall and an exterior portion extending laterally to the outside of the annular wall, said radial portion being positioned between the bearing end of the spring and said sealing portion;
a seal plate for closing said open body end and having a planar surface to engage with said sealing portion;
means for retaining the annular ring relative to said planar surface to maintain the sealing portion under a compressive force in fluid tight engagement with the planar surface;

said exterior portion of said annular ring being defined by a peripheral edge of said annular ring deformed from said radial portion toward said open body end, said seal plate having a complementary deformed peripheral edge to engage the peripheral edge of the annular ring when said sealing portion is compressed.

24. The composite spring recited in claim 23, including peripheral clamp means for drawing said annular ring toward said sealing plate.

* * * * *